June 12, 1956        H. G. OCH        2,750,110
AUTOMATIC COMPUTER
Filed July 16, 1952
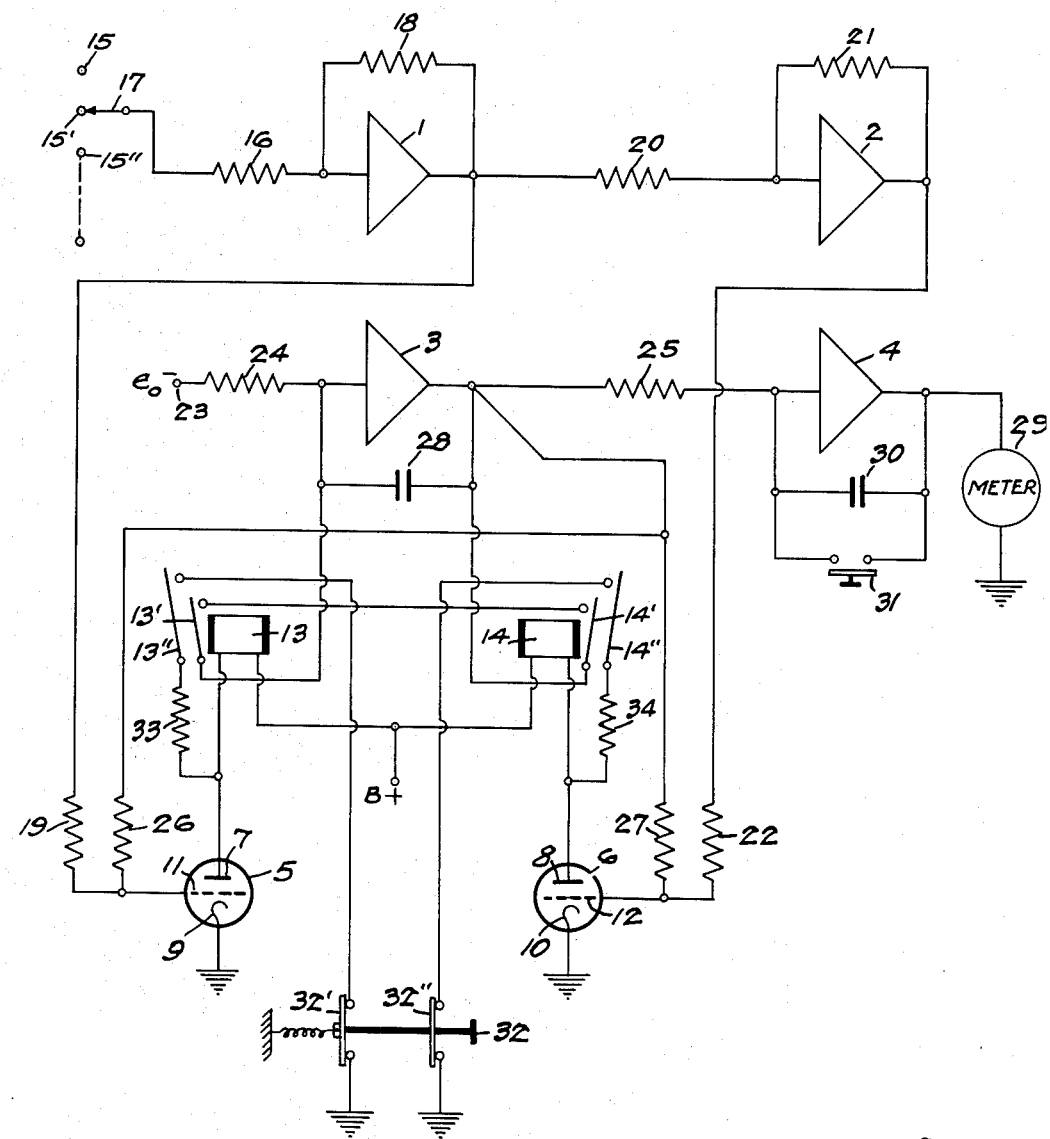
Inventor
Henry G. Och
By G. J. Kessenich, A. W. Dew
and P. M. Craig, Jr.
Attorneys United States Patent Office 2,750,110
Patented June 12, 1956

2,750,110

AUTOMATIC COMPUTER

Henry G. Och, Short Hills, N. J., assignor, by mesne assignments, to the United States of America as represented by the Secretary of the Army Application July 16, 1952, Serial No. 299,078

7 Claims. (Cl. 235—61)

The present invention relates to a computer which determines the root means square value of a number of successively applied direct voltages.

More particularly, the present invention relates to an electronic computer circuit which computes automatically the root means square value of a number of successively applied direct voltages by accumulating successive squares of input signals all scaled by a common multiplier which may be read directly on an appropriately calibrated output meter.

It is accordingly an object of the present invention to provide a computer which will automatically determine the root means square value of a plurality of successively applied direct voltages.

It is another object of the present invention to provide a root mean square value computer for successively applied direct signals which is simple in structure and reliable in operation.

A still further object of the present invention is to provide a computer which will comput the root means square value of successively applied direct voltages by use of the principle of double integration with respect to time.

The specific nature of the present invention as well as other objects, advantages and features thereof will be obvious from the following description when taken in connection with the accompanying drawing which shows for purposes of illustration only one specific embodiment of the present invention, and wherein:

The single figure shows diagrammatically one preferred embodiment of the computer circuit in accordance with the present invention.

In large production of component parts, it is generally essential that a more or less continuous statistical analysis be made to determine the uniformity of the product and to provide the necessary manufacturing control. In many cases this is done by sampling, and, generally, it is adequate to know the root mean square deviation of all these samples rather than the individual deviations. When the deviations of these samples from a desired mean can be realized as a direct voltage proportional to the deviation, then the root means square value can be readily determined by the computing circuit described herein.

One possible application of the computer circuit in accordance with the present invention resides in a statistical analysis of direct current amplifier drift in electronic computers.

The computation in accordance with the present invention is theoretically exact since it utilizes no non-linear elements to square the signal voltages. Instead it makes use of the fact that the double integral with respect to time of a constant is proportional to the square of time. The computer circuit in accordance with the present invention automatically times the integration for a period proportional to the input to be measured, and thus obtains a value proportional to the square thereof. In addition the computing system is so arranged that successive measurements are cumulative whereby the output voltage indicated on an output meter at any time is the sum of the squares of the individual inputs. If the output meter is provided with a square-root scale proportioned for a predetermined number N of samples, it will result in a direct reading of the root means square value thereof.

Referring more particularly to the drawing, the circuit comprises four direct-current amplifiers 1, 2, 3 and 4, which may be of conventional design. Amplifiers 1 and 2 are used as sign reversing amplifiers whereas amplifiers 3 and 4 are used as integrating amplifiers. Control amplifiers 5 and 6, each comprising a plate 7 and 8, a cathode 9 and 10, and at least one control grid 11 and 12, control relays 13 and 14 respectively. Plate 7 of amplifier 5 is connected to one side of relay 13, the other side thereof being connected to the positive terminal B+ of the power supply. Similarly, plate 8 is connected to one side of relay 14, the other side thereof being also connected to B+. Cathodes 9 and 10 are connected to ground. The input of amplifier 1 is connected to input terminals 15, 15', 15'' etc., through resistor 16 and movable arm 17 of a switch (not shown). Resistor 18 connected between the input and output of amplifier 1 represents diagrammatically the feed-back characteristic of amplifier 1. The output of amplifier 1 is connected to control grid 11 of amplifier 5 through resistor 19 and to the input of amplifier 2 through resistor 20. Feed-back resistor 21 is connected between the input and output of amplifier 2, the output being further connected to control grid 12 of amplifier 6 through resistor 22. The input of amplifier 3 is connected to the terminal 23 of the negative input voltage $e_0$ through resistor 24. The output of amplifier 3 is connected to the input of amplifier 4 through resistor 25, and to control grids 11 and 12 of amplifiers 5 and 6 through resistors 26 and 27 respectively. A first integrating capacitor 28 is connected between the input and output of amplifier 3. The output of amplifier 4 is connected to one terminal of meter 29, the other side of which is connected to ground. A second integrating capacitor 30 is connected between the input and output of amplifier 4, and is shunted by a normally open switch 31, which may be used to short-circuit or discharge capacitor 30 as will be described more fully hereinafter.

Relays 13 and 14 are each of the double-pole, single-throw type comprising contactors 13' and 13'', and 14' and 14'' respectively. Upon closure of contactors 13' and 14', a circuit is established across capacitor 28 which serves the purpose of short-circuiting or discharging the same. A holding circuit for the winding of relay 13 is established upon closure of contactor 13'' leading from ground through normally closed contact 32' of switch 32 and resistor 33. Likewise a holding circuit for the winding of relay 14 is established upon closure of contactor 14'' leading from ground through normally closed contact 32'' of switch 32 and resistor 34. The holding circuits for relays 13 and 14 are thereby in parallel with amplifiers 5 and 6.

*Operation*

Amplifiers 1 and 2 are used as isolating and sign reversing amplifiers respectively, and amplifiers 3 and 4 as integrators. The sign reversing amplifier 2 is necessary to render the operation of the computer circuit independent of the sign of the input voltage, as is desirable for evaluating the root means square value. Control amplifiers 5 and 6 are normally conducting with zero voltage applied to their respective inputs 11 and 12, but the plate currents under those conditions are just inadequate to operate relays 13 and 14. Relays 13 and 14 are each provided with self-locking contacts 13'' and 14'', which will lock relays 13 and 14 once operated, until start button or switch 32 is operated by depressing the same.

When the computer circuit is first turned on, and no signal is applied to the input circuit of isolating amplifier 1, relays 13 and 14 are not operated. This permits amplifier 3 to integrate, since contactors 13' and 14' are open thereby permitting capacitor 28 to charge. Assuming the input signal $e_0$ is negative, the output of amplifier 3 becomes more positive which in turn makes grids 11 and 12 of control amplifiers 5 and 6 sufficiently positive to operate relays 13 and 14, which will remain energized through the self-locking circuit including contactors 13'' and 14''. Contactors 13' and 14' also close, thereby short-circuiting capacitor 28, which, after discharge thereof, will return the output of amplifier 3 to zero potential. This in turn renders the plate currents of amplifiers 5 and 6 to a value insufficient to operate relays 13 and 14 in themselves. However relays 13 and 14 remain energized through their self-locking circuits. Before starting a series of measurements the reset button or switch 31 is depressed, which momentarily short-circuits capacitor 30, and thus restores the output of amplifier 4 to zero potential. The circuit is now ready to begin measurements.

It is assumed that the first signal $x_1$ to be measured is positive. When it is applied to the input circuit of amplifier 1 through one of the input terminals 15, 15', 15'', etc., switch 17 and resistor 16, it is amplified by amplifier 1 to a value $-Kx_1$ which is applied to grid 11 of amplifier 5, thereby cutting off its plate current completely. The signal is reversed by amplifier 2 to a value $+K_1x_1$ which is applied to the grid 12 of amplifier 6, causing a plate current to flow in amplifier 6 which in itself is adequate to operate relay 14. Now the start button 32 is momentarily depressed which breaks the self-locking circuit for relays 13 and 14 by opening contacts 32' and 32''. Relay 13 drops out since control amplifier 5 is cut off, but relay 14 remains energized since control amplifier 6 is conducting thereby furnishing adequate operating current. The opening of contactor 13' starts the integration by amplifier 3 to produce a voltage $$E_3 = e_0 \frac{t}{R_3 C_3}$$

When this voltage $E_3$ has built up to a value equal in magnitude to the voltage $-Kx_1$ applied to the grid 11 of amplifier 5, the cut off bias will be overcome and amplifier 5 will again permit a plate current to flow sufficient to reoperate relay 13, which in turn upon closure of contactor 13' will stop the integration of amplifier 3. the time $t_1$ during which the integration took place is $$t_1 = \frac{R_3 C_3}{e_0} K x_1$$

During the same period of time $t_1$, amplifier 4 integrated to produce a voltage $$E_4 = \int_0^{t_1} -\frac{E_3 dt}{R_4 C_4} = \int_0^{t_1} -\frac{e_0 t \, dt}{R_3 R_4 C_3 C_4} = \frac{-e_0 t^2}{2 R_3 R_4 C_3 C_4}\bigg|_0^{t_1} = \frac{-e_0 t_1^2}{2 R_3 R_4 C_3 C_4} = \frac{-K^2 R_3 C_3}{2 e_0 R_4 R_4}(x_1)^2$$

When $E_3$ returned to zero at the end of time $t_1$, amplifier 4 stopped integrating, but retained its output voltage $E_4$. This voltage $E_4$ now becomes a base value from which amplifier 4 starts the next integration.

It is next assumed that the second signal $x_2$ to be measured is negative. When it is applied to the input circuit of amplifier 1, the polarity of the signals on grids 11 and 12 of amplifiers 5 and 6 are interchanged from those of the previous description of operation with reference to the first input signal, and, therefore, when the start button 32 is momentarily depressed, the functioning of relays 13 and 14 are merely reversed, i. e. amplifier tube 5 is now conducting retaining relay 13 energized, whereas tube 6 is biased to cut off, thereby keeping relay 14 deenergized.

Amplifier 3 now integrates until $$E_3' = \frac{e_0 t_2}{R_3 C_3} = K x_2$$

The time $t_2$ of this integration is given by the equation $$t_2 = \frac{R_3 C_3}{e_0} K x_2$$

Amplifier 4 integrates during the same time $t_2$ from an initial output voltage $$E_4 = -\frac{K^2 R_3 C_3}{2 e_0 R_4 C_4}(x_1)^2$$

to a new value $$E_4' = -\frac{K^2 R_3 C_3}{2 e_0 R_4 C_4}(x_1^2 + x_2^2)$$

It is thus seen that amplifier 4 accumulates successive squares of input signals all scaled by a common multiplier. After N input signals have been applied to the computer circuit, the value of the final output voltage $E_{4_f}$ assumes a value of $$E_{4_f} = -\frac{K^2 R_3 C_3}{2 e_0 R_4 C_4} \sum_{J=0 \text{ to } N} x_j^2$$

This final voltage $E_{4_f}$ will appear on the output meter.

If this meter is now calibrated with a square root scale, with the proper scale factor chosen for the N measurements, then the reading of the meter will be the root mean square value of the series of N measurements.

It is obvious that the series of measurements could be made automatically by connecting the input signals to the terminals of a selector switch or relay chain which is automatically indexed by means of appropriate control circuits for the indexing mechanism, each time relays 13 and 14 stop integration.

While I have shown and described only one preferred embodiment of my invention it will be obvious to those skilled in the art that it is not so limited, but is susceptible of various other changes and modifications without departing from the spirit thereof, and I desire therefore, that only such limitations shall be placed thereupon as are imposed by the pirior art or as are specifically set forth in the appended claims.

I claim:

1. A computer circuit adapted to determine the root mean square deviation from a desired mean comprising first electronic integrating means, means to apply a constant voltage to the said first integrating means, second electronic integrating means connected to the output of said first integrating means, electronic isolating means connected to receive signals to be measured, electronic sign reversing means connected to the output of said isolating means, first electronic control means connected to receive the output of said isolating means, second electronic control means connected to receive the output of said sign reversing means, said first and said second control means connected to the said first integrating means to permit integration by said first integrating means and said second integrating means for a time proportional to the value of the said signal to be measured, said second integrating means adapted to accumulate successive squares of the said signals.

2. A computer circuit adapted to determine the root mean square deviation from a desired mean comprising a first integrating circuit, means to apply a constant voltage to said first integrating circuit, a second integrating circuit connected to the output of said first integrating circuit, an isolating amplifier connected to receive signals to be measured, a sign reversing amplifier connected to the output of said isolating amplifier, and control means comprising a first control amplifier connected to receive the outputs of said isolating amplifier and of said first integrating circuit, a second control amplifier connected to receive the outputs of said sign reversing amplifier and of said first integrating circuit, a first relay and a second relay connected respectively to the outputs of said first and second control amplifiers, said control means operative to permit integration by said first and second integration circuits for a time proportional to the value of the said signal to be measured, said second integrating circuit adapted to accumulate successive squares of the said signals.

3. The circuit made according to claim 2 including an indicating means connected to the output of the said second integrating circuit.

4. A computer circuit adapted to determine the root mean square deviation from a desired mean comprising a first integrating circuit, means to apply a constant voltage to the said first integrating circuit, a second integrating circuit connected to the output of said first integrating circuit, an isolating circuit connected to receive signals to be measured, a signal sign reversing circuit connected to the output of said isolating circuit, a first control circuit connected to receive the outputs of said isolating and of said first integrating circuit, a second control circuit connected to receive the outputs of said signal sign reversing circuit and of said first integrating circuit, said first and said second control circuits including respective relays interconnected to permit integration by said first and second integrating circuits for a time proportional to the value of the said signals to be measured, said second integrating circuit adapted to accumulate successive squares of the said signals.

5. The invention as set forth in claim 4 wherein the said relays are connected in series to short circuit the said first integrating circuit prior to start of integration.

6. The invention as set forth in claim 5 including switching means operable to remove the short circuit by open circuiting the relay connected in the respective control circuit which is in cut off condition.

7. A computer circuit adapted to determine the root mean square deviation from a desired mean comprising a first integrating amplifier, means to apply a constant voltage to said first integrating amplifier, a second integrating amplifier connected to the output of said first integrating circuit, an isolating amplifier connected to receive signals to be measured, a signal sign reversing amplifier connected to the output of said isolating amplifier, a first control amplifier connected to receive the outputs of said isolating circuit and of said first integrating circuit, a second control amplifier connected to receive the outputs of said signal sign reversing circuit and of said first integrating circuit, a first relay connected to be energized by said first control amplifier, a second relay connected to be energized by said second control amplifier, the said first and second relays connected to each other and to said first integrating amplifier to short circuit the same prior to start of integration, and switching means connected to remove the short circuit to permit integration for a time proportional to the value of the said signals to be measured, the said second integrating circuit operable to accumulate successive squares of the said signals.

References Cited in the file of this patent

UNITED STATES PATENTS

| | | |
|---|---|---|
| 2,206,252 | Gould | July 2, 1940 |
| 2,397,467 | Bush et al. | Apr. 2, 1946 |
| 2,551,964 | Norton | May 8, 1951 |
| 2,607,528 | McWhirter et al. | Aug. 19, 1952 |

OTHER REFERENCES

"Design of D. C. Electronic Integrators," by G. A. Korn, May 1948 issue Electronics; pages 124–126.